(12) United States Patent
Kadotani et al.

(10) Patent No.: US 10,809,608 B2
(45) Date of Patent: Oct. 20, 2020

(54) PROJECTION-TYPE DISPLAY APPARATUS

(71) Applicant: SEIKO EPSON CORPORATION, Tokyo (JP)

(72) Inventors: Norikazu Kadotani, Azumino (JP); Kaname Nagatani, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/406,411

(22) Filed: May 8, 2019

(65) Prior Publication Data
US 2019/0346756 A1 Nov. 14, 2019

(30) Foreign Application Priority Data
May 9, 2018 (JP) .................. 2018-090388

(51) Int. Cl.
G03B 21/20 (2006.01)
G03B 21/00 (2006.01)
G03B 21/28 (2006.01)
G02B 27/28 (2006.01)
G02B 27/14 (2006.01)
G02B 5/30 (2006.01)
G02B 27/10 (2006.01)

(52) U.S. Cl.
CPC ....... *G03B 21/2073* (2013.01); *G02B 5/3058* (2013.01); *G02B 27/1046* (2013.01); *G02B 27/141* (2013.01); *G02B 27/286* (2013.01); *G03B 21/006* (2013.01); *G03B 21/28* (2013.01)

(58) Field of Classification Search
CPC .. G03B 21/005; G03B 21/006; G03B 21/208; G03B 21/2013; G03B 21/2033; G03B 21/53; G03B 21/2073; G02B 27/141; G02B 27/149; G02B 27/283; G02B 27/286; G02B 27/1006; G02B 27/1046
See application file for complete search history.

(56) References Cited

U.S. PATENT DOCUMENTS

| 8,226,247 | B2* | 7/2012 | Kitano ................. G02B 26/06 353/119 |
| 2005/0190345 | A1* | 9/2005 | Dubin ................ G03B 21/2053 353/85 |
| 2006/0028620 | A1* | 2/2006 | Conner ............... G02B 27/283 353/20 |
| 2009/0096991 | A1* | 4/2009 | Chien .................. G03B 35/26 353/8 |
| 2018/0039065 | A1* | 2/2018 | Iwai .................... G02B 25/001 |

FOREIGN PATENT DOCUMENTS

JP 2015-200807 A 11/2015

* cited by examiner

*Primary Examiner* — Sultan Chowdhury
(74) *Attorney, Agent, or Firm* — Oliff PLC (57) ABSTRACT

In a projection-type display apparatus, a polarization converter, a light-incident-side polarizer, a first liquid crystal device, a first light-exiting-side polarizer, and a retardation film are arranged along the optical path from a light source section to a projection system. The light-incident-side polarizer is a wire grid polarizer including a wire grid integrally provided on the light exiting surface of the polarization converter, and the light-incident-side polarizer and the polarization converter form a single optical part. The first light-exiting-side polarizer is a wire grid polarizer including a wire grid integrally provided on the light exiting surface of the first liquid crystal device, and the first light-exiting-side polarizer and the first liquid crystal device form a single optical part.

17 Claims, 10 Drawing Sheets

PROJECTION-TYPE DISPLAY APPARATUS

The present application is based on, and claims priority from JP Application Serial Number 2018-090388, filed May 9, 2018, the disclosure of which is hereby incorporated by reference herein in its entirety.

BACKGROUND

1. Technical Field

The present disclosure relates to a projection-type display apparatus including a liquid crystal device and a wire-grid polarizer.

2. Related Art

As a projection-type display apparatus, a polarization converter, a light-incident-side polarizer, a liquid crystal device, and a light-exiting-side polarizer are arranged along the optical path from a light source section to a projection system, and these optical elements are fixed, for example, to a frame. For example, a retardation film and the light-incident-side polarizer are disposed on the light incident side of the liquid crystal device and fixed in a predetermined manner (see JP-A-2015-200807).

JP-A-2015-200807 is an example of the related art.

In the case where a plurality of optical elements, such as the polarization converter, the light-incident-side polarizer, the liquid crystal device, and the light-exiting-side polarizer, are arranged along the optical path from the light source section to the projection system, the part cost, assembly cost, other costs increase as the number of arranged optical elements increases.

As another problem, in a case where the light-incident-side polarizer is so disposed as to face the light incident side of the liquid crystal device, heat accumulates in the narrow space between the liquid crystal device and the polarizer, undesirably resulting in degradation of the liquid crystal device or the polarizer.

SUMMARY

An advantage of some aspects of the present disclosure is to reduce the number of polarizers each used as a discrete optical element in a projection-type display apparatus.

A projection-type display apparatus according to an aspect of the present disclosure includes a light source that outputs light having a first polarization component and a second polarization component having a polarization direction different from a polarization direction of the first polarization component, a polarization converter on which the light is incident, which transmits the first polarization component, and converts the second polarization component into the first polarization component and causes the converted first polarization component to exit, a light-incident-side polarizer that transmits the first polarization component out of light having exited out of the polarization converter, a first liquid crystal device that modulates light having exited out of the light-incident-side polarizer, a first light-exiting-side polarizer provided in an optical path of light having exited out of the first liquid crystal device, and a projection system that projects light having exited out of the first light-exiting-side polarizer, and the light-incident-side polarizer includes a wire grid layered on a light exiting surface of the polarization converter.

In the aspect of the present disclosure, the light-incident-side polarizer is a wire-grid polarizer including the wire grid integrally provided on the light exiting surface of the polarization converter. The polarization converter and the light-incident-side polarizer can therefore be handled as a single optical part. Therefore, even in a case where the polarization converter, the light-incident-side polarizer, the first liquid crystal device, and the first light-exiting-side polarizer are arranged along the optical path from the light source to the projection system, the number of optical parts to be each handled as a discrete optical element can be reliably reduced, whereby the projection-type display apparatus can be efficiently assembled. Further, unlike in a case where the light-incident-side polarizer is a discrete optical element, stress induced in the light-incident-side polarizer is unlikely to result in breakage of the light-incident-side polarizer. Moreover, unlike in a case where the light-incident-side polarizer is so disposed as to face the first liquid crystal device, a smaller number of optical parts are disposed in the vicinity of the first liquid crystal device, whereby there is spatial room around the first liquid crystal device. The spatial room therefore readily achieves a configuration in which cooling air or any other fluid is caused to flow to a portion close to the first liquid crystal device, a configuration in which a holder that holds the first liquid crystal device is provided with a channel through which cooling air or any other fluid is caused to flow, and other configurations.

In the aspect of the present disclosure, the projection-type display apparatus may further include a color separation system that separates from the light having exited out of the light-incident-side polarizer into first color light to be incident on the first liquid crystal device and second color light that belongs to a wavelength region different from a wavelength region to which the first color light belongs, a second liquid crystal device on which the second color light is incident and which modulates the second color light, a second light-exiting-side polarizer provided in an optical path of light having exited out of the second liquid crystal device, and a first dichroic mirror that combines the light having exited out of the first light-exiting-side polarizer and light having exited out of the second light-exiting-side polarizer with each other and causes the combined light to exit toward the projection system. According to the configuration described above, the light-incident-side polarizer functions as a polarizer common to the plurality of liquid crystal devices. Therefore, the number of parts and the number of steps of assembling the projection-type display apparatus can be reduced, whereby the cost of the projection-type display apparatus can be reduced.

In the aspect of the present disclosure, the projection-type display apparatus may further include a third liquid crystal device that modulates third color light that belongs to a wavelength region different from the wavelength regions to which the first color light and the second color light belong, a third light-exiting-side polarizer provided in a light exiting optical path from the third liquid crystal device, and a cross dichroic prism that includes a first dichroic mirror and a second dichroic mirror and combines an optical path from the first light-exiting-side polarizer to the projection system, an optical path from the second light-exiting-side polarizer to the projection system, and an optical path from the third light-exiting-side polarizer to the projection system with one another, and the color separation system may separate the first color light and the second color light and further the third color light from the light having exited out of the light-incident-side polarizer.

In the aspect of the present disclosure, the first light-exiting-side polarizer may be a wire-grid polarizer including a wire grid integrally provided on a light exiting surface of the first liquid crystal device.

In the aspect of the present disclosure, the projection-type display apparatus may further include a retardation film provided in an optical path from the first liquid crystal device to the first dichroic mirror. In this case, the retardation film may be integrally provided on a light exiting surface of the first liquid crystal device. In the aspect of the present disclosure, the first light-exiting-side polarizer may be a wire-grid polarizer including a wire grid integrally provided on one of a light incident surface and a light exiting surface of the retardation film.

In the aspect of the present disclosure, a retardation film may be integrally provided on a light incident surface of the first liquid crystal device.

In the aspect of the present disclosure, the projection-type display apparatus may further include a retardation film provided in an optical path from the first liquid crystal device to the cross dichroic prism, and the retardation film may be so provided as to be integrated with the cross dichroic prism. In this case, the first light-exiting-side polarizer may be a wire-grid polarizer including a wire grid integrally provided on one of a light incident surface and a light exiting surface of the retardation film.

In the aspect of the present disclosure, the second light-exiting-side polarizer may be a wire-grid polarizer including a wire grid integrally provided on a light exiting surface of the second liquid crystal device.

In the aspect of the present disclosure, the third light-exiting-side polarizer may be a wire-grid polarizer including a wire grid integrally provided on a light exiting surface of the third liquid crystal device.

In the aspect of the present disclosure, at least one of the first light-exiting-side polarizer, the second light-exiting-side polarizer, and the third light-exiting-side polarizer may be a wire-grid polarizer including a wire grid layered on the cross dichroic prism.

In the aspect of the present disclosure, the first light-exiting-side polarizer, the second light-exiting-side polarizer, and the third light-exiting-side polarizer may each be a wire-grid polarizer including a wire grid layered on the cross dichroic prism.

DESCRIPTION OF EXEMPLARY EMBODIMENTS

Embodiments of the present disclosure will be described with reference to the drawings. In the figures to which the following description refers, layers and members are so independently drawn at scales different from one another as to be large enough to be recognizable in the figures. The following description will be made on the assumption that out of two polarization components having polarization directions different from each other, the polarization component having one of the polarization directions (first polarization component) is called "s-polarization component" and the polarization component having the other polarization direction (second polarization component) is called "p-polarization component". The following description will also be made on the assumption that first color light that belongs to a first wavelength region is called blue light B, second color light that belongs to a second wavelength region different from the first wavelength region is called green light G, and third color light that belongs to a third wavelength region different from the first and second wavelength regions is called red light R.

First Embodiment

Figure 1:
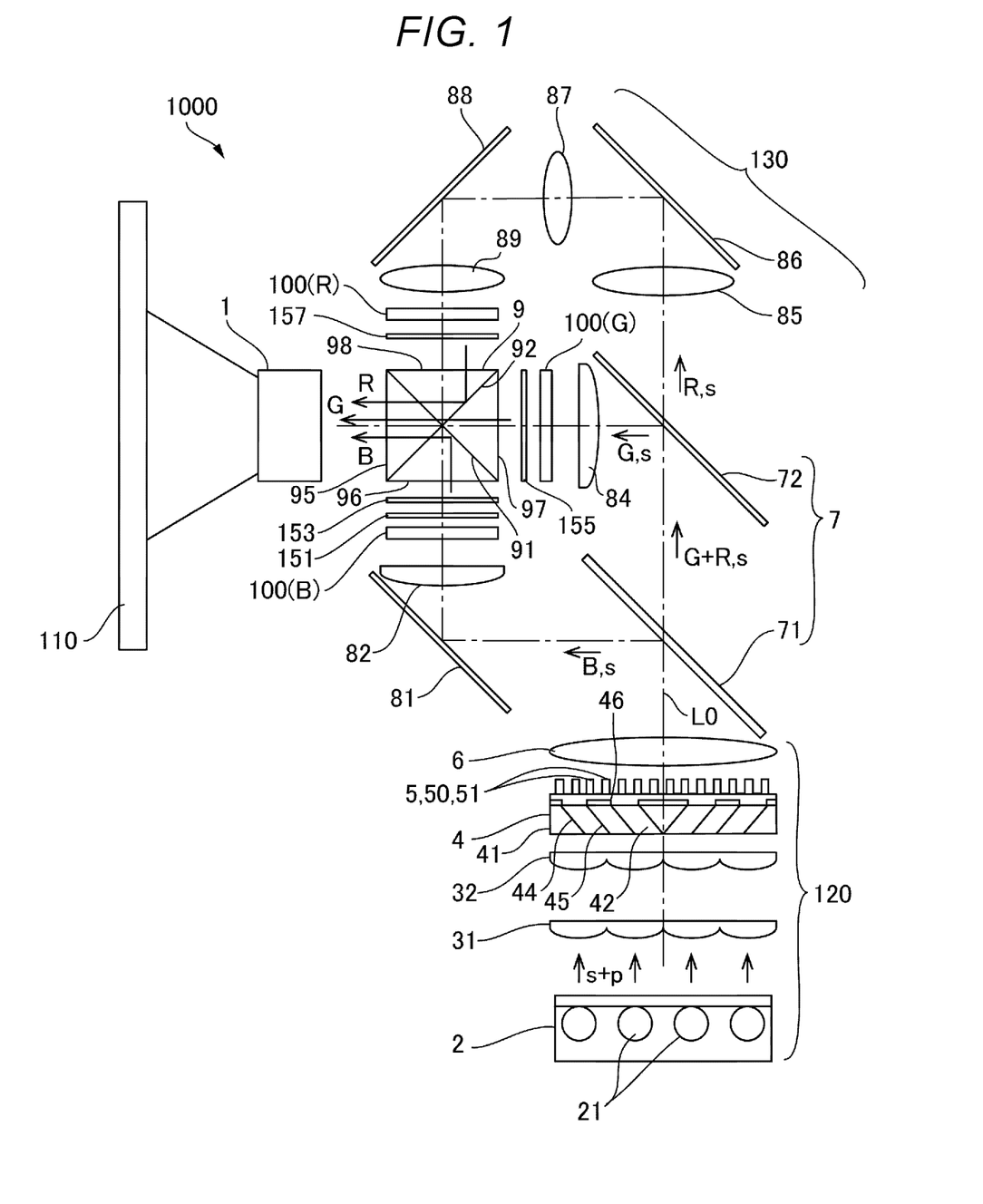
FIG. 1 is a descriptive diagram diagrammatically showing the configuration of a projection-type display apparatus according to a first embodiment of the present disclosure.
Figure 2:
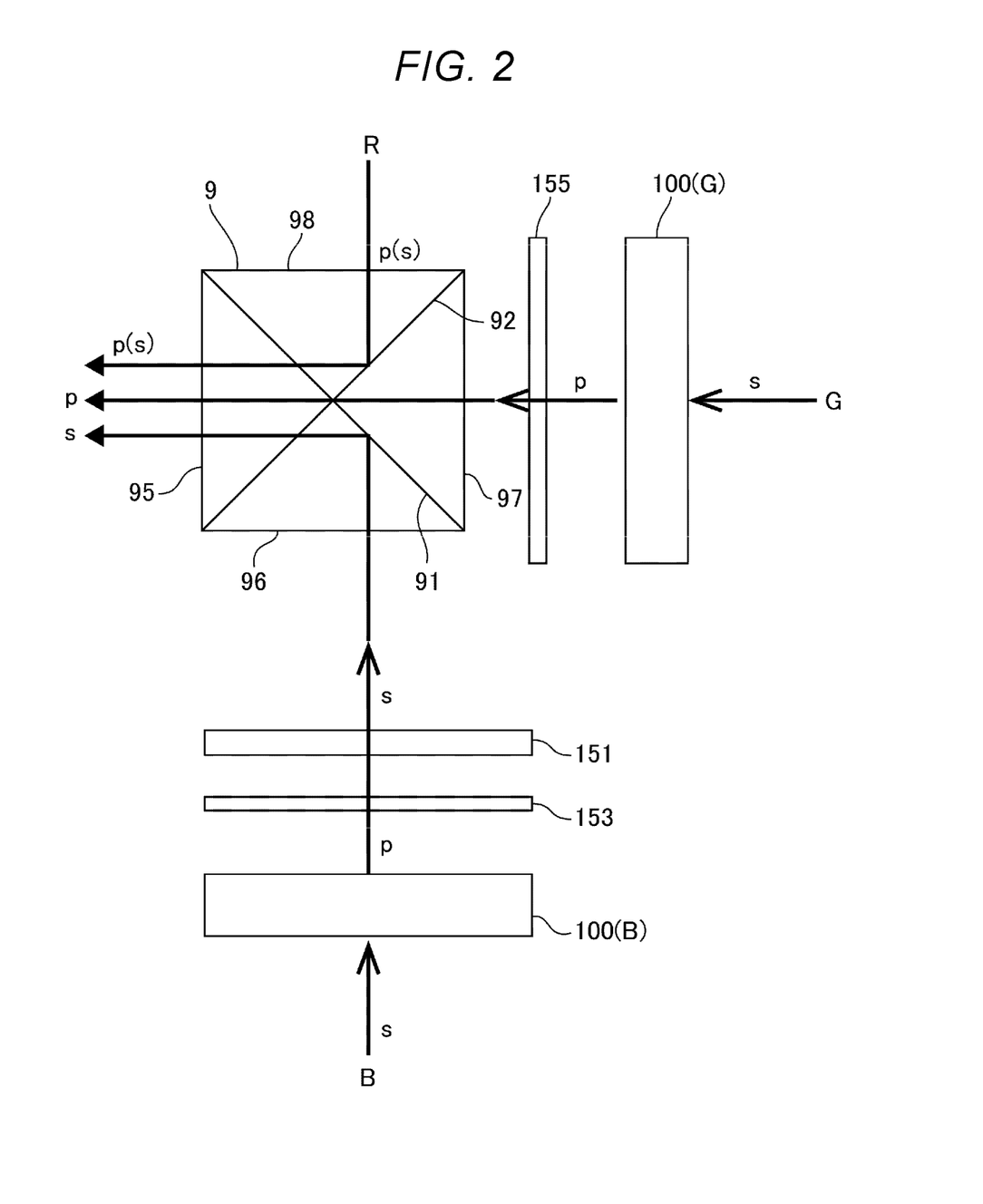
FIG. 2 is a descriptive diagram showing the polarization direction of each modulated light that enters a cross dichroic prism shown in FIG. 1.

FIG. 1 is a descriptive diagram diagrammatically showing the configuration of a projection-type display apparatus 1000 according to a first embodiment of the present disclosure. FIG. 2 is a descriptive diagram showing the polarization direction of each modulated light that enters a cross dichroic prism shown in FIG. 1.

The projection-type display apparatus 1000 shown in FIG. 1 is a liquid crystal projector using transmissive liquid crystal panels and irradiates a light projection member 110, which is formed, for example, of a screen, with light to display an image. The projection-type display apparatus 1000 includes an illuminator 120, a plurality of liquid crystal devices to which light outputted from the illuminator 120 is supplied, a cross dichroic prism 9 (light combining system), which combines the light outputted from the plurality of liquid crystal devices with one another and causes the combined light to exit, and a projection system 1, which projects the combined light from the cross dichroic prism 9, with the components described above arranged along an apparatus optical axis L0. The cross dichroic prism 9 has four side surfaces, which form a first light incident surface 96, a second light incident surface 97, which is adjacent to the first light incident surface 96, a third light incident surface 98, which is adjacent to the second light incident surface 97, and a light exiting surface 95, which faces away from the second light incident surface 97. In the present embodiment, as the plurality of liquid crystal devices, a first liquid crystal device 100(B), which modulates the blue light B as first color light, a second liquid crystal device 100(G), which modulates the green light G as second color light, and a third liquid crystal device 100(R), which modulates the red light R as third color light. The first liquid crystal device 100(B) is so disposed as to face the first light incident surface 96, the second liquid crystal device 100(G) is so disposed as to face the second light incident surface 97, the third liquid crystal device 100(R) is so disposed as to face the third light incident surface 98, and the projection system 1 is so disposed as to face the light exiting surface 95. The projection-type display apparatus 1000 further includes dichroic mirrors 71 and 72 and a relay system 130.

In the illuminator 120, a light source section 2, a first optical integration lens 31, which is formed of a lens array, such as a fly-eye lens, a second optical integration lens 32, which is formed of a lens array, such as a fly-eye lens, a polarization converter 4, and a condenser lens 6 are sequentially arranged along the apparatus optical axis L0.

The light source section 2 includes as a light source a plurality of solid-state light sources 21 and outputs white light containing the red light R, the green light G, and the blue light B. The light source section 2 instead uses an ultrahigh-pressure mercury lamp as the light source in some cases. The first optical integration lens 31 and the second optical integration lens 32 homogenize the illuminance distribution of the light outputted from the light source section 2.

The polarization converter 4 converts the light outputted from the light source section 2 into polarized light having a specific oscillation direction, for example, the s-polarization component, as will be described later with reference to FIG. 3. The polarization converter 4 is provided with a light-incident-side polarizer 5 in the form of a wire-grid polarizer, which is formed by layering a wire grid 50 on the light exiting surface of the polarization converter 4, as will be described later with reference to FIG. 3. That is, the polarization converter 4 and the light-incident-side polarizer 5 are formed as an integrated part.

The dichroic mirror 71 reflects the blue light B contained in the light outputted from the illuminator 120 and transmits the green light G and the red light R contained therein. The dichroic mirror 72 receives the green light G and the red light R having passed through the dichroic mirror 71, transmits the red light R, and reflects the green light G. The dichroic mirrors 71 and 72 form a color separation system 7, which separates the light outputted from the illuminator 120 into the red light R, green light G, and the blue light B.

The first liquid crystal device 100(B) is a transmissive liquid crystal device that modulates the s-polarized blue light B having been reflected off the dichroic mirror 71 and having traveled via a reflection mirror 81 and a relay lens 82 in accordance with an image signal. A retardation film 151 and a first light-exiting-side polarizer 153 are provided in the exiting optical path from the first liquid crystal device 100(B) to the cross dichroic prism 9. The retardation film 151 is a λ/2 retardation film. The first liquid crystal device 100(B) modulates the s-polarization component in accordance with an image signal to convert the s-polarization component into the p-polarization component (circularly polarized light or elliptically polarized light in the case of half tone), as shown in FIG. 2. The retardation film 151 converts the p-polarization component outputted from the first liquid crystal device 100(B) into the s-polarization component and the s-polarization component outputted from the first liquid crystal device 100(B) into the p-polarization component. The first light-exiting-side polarizer 153 blocks the p-polarization component and transmits the s-polarization component. The first liquid crystal device 100(B) therefore modulates the blue light B in accordance with the image signal, and the modulated blue light B enters as the s-polarization component the cross dichroic prism 9.

The second liquid crystal device 100(G) is a transmissive liquid crystal device that modulates the s-polarized green light G having been reflected off the dichroic mirror 72 and having traveled via a relay lens 84 in accordance with an image signal. A second light-exiting-side polarizer 155 is provided between the second liquid crystal device 100(G) and the cross dichroic prism 9. The second liquid crystal device 100(G) modulates the s-polarization component in accordance with an image signal to convert the s-polarization component into the p-polarization component (circularly polarized light or elliptically polarized light in the case of half tone). The second light-exiting-side polarizer 155 blocks the s-polarization component and transmits the p-polarization component. The second liquid crystal device 100(G) therefore modulates the green light G in accordance with the image signal, and the modulated green light G enters as the p-polarization component the cross dichroic prism 9.

The third liquid crystal device 100(R) is a transmissive liquid crystal device that modulates the s-polarized red light R having passed through the dichroic mirror 72 and traveled via a relay lens 85, a reflection mirror 86, a relay lens 87, a reflection mirror 88, and a relay lens in accordance with an image signal. A third light-exiting-side polarizer 157 is provided between the third liquid crystal device 100(R) and the cross dichroic prism 9. The third liquid crystal device 100(R) modulates the s-polarization component in accordance with the image signal to convert the s-polarization component into the p-polarization component (circularly polarized light or elliptically polarized light in the case of half tone). The third light-exiting-side polarizer 157 is a polarizer that blocks the s-polarization component and transmits the p-polarization component. Therefore, the third liquid crystal device 100(R) modulates the red light R in accordance with the image signal, and the modulated red light R travels toward the cross dichroic prism 9.

The cross dichroic prism 9 is a light combining system in which two dichroic mirrors (first dichroic mirror 92 and second dichroic mirror 92) are so disposed as to be perpendicular to each other in an X-letter shape. The first dichroic mirror 91 is a film that reflects the blue light B and transmits the green light G and combines the optical path of the blue light B, which exits from the first light-exiting-side polarizer 153 and reaches the projection system 1, and the optical path of the green light G, which exits from the second light-exiting-side polarizer 155 and reaches the projection system 1, with each other. The second dichroic mirror 92 is a film that reflects the red light R and transmits the green light G and combines the optical path of the green light G, which exits from the second light-exiting-side polarizer 155 and reaches the projection system 1, and the optical path of the red light R, which exits from the third light-exiting-side polarizer 157 and reaches the projection system 1, with each other. The cross dichroic prism 9 therefore combines the blue light B, the green light G, and the red light R modulated by the first liquid crystal device 100(B), the second liquid crystal device 100(G), and the third liquid crystal device 100(R) with one another and causes the combined light toward the projection system 1. The projection system 1 includes a projection lens (not shown) and projects the combined light from the cross dichroic prism 9 onto the light projection member 110, such as a screen.

In the present embodiment, the light that enters the cross dichroic prism 9 from the first liquid crystal device 100(B) is the s-polarized blue light B, and the light that enters the cross dichroic prism 9 from the second liquid crystal device 100(G) is the p-polarized green light G. In general, a dichroic film excels in reflection of the s-polarization component. The cross dichroic prism 9 therefore properly allows the blue light B to exit.

Although the light that enters the cross dichroic prism 9 from the third liquid crystal device 100(R) is the p-polarized red light R, placing a λ/2 retardation film in a position between the third liquid crystal device 100(R) and the cross dichroic prism 9 allows the light that enters the cross dichroic prism 9 from the third liquid crystal device 100(R) to be converted into s-polarized red light R, as indicated by "s" in the parentheses in FIG. 2.

The retardation film (λ/2 retardation film) may instead be disposed on the light incident side of the liquid crystal device.

Configuration of Polarization Converter 4 and Light-Incident-Side Polarizer 5

Figure 3:
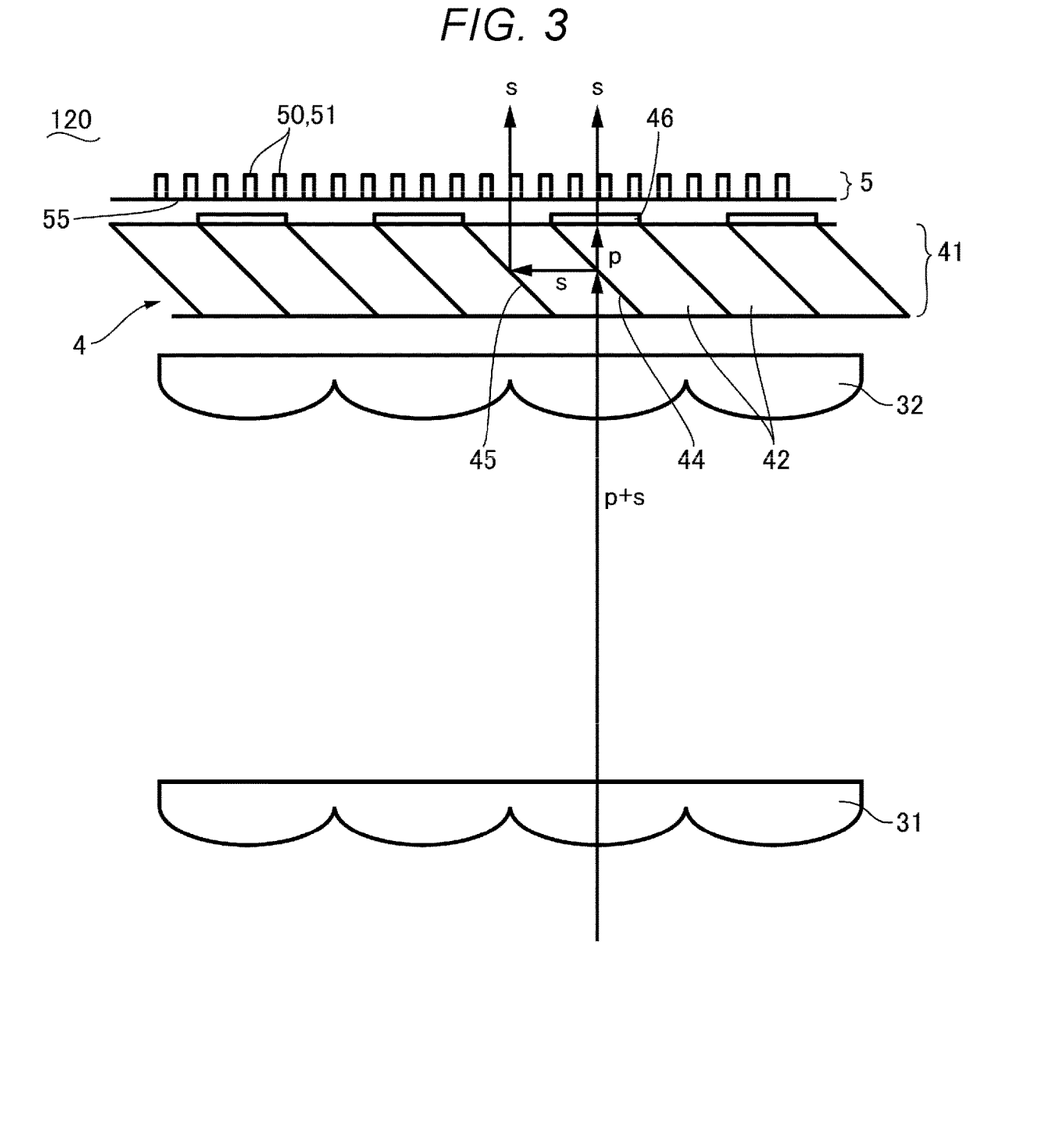
FIG. 3 is a descriptive diagram diagrammatically showing the configurations of a polarization converter and a light-incident-side polarizer shown in FIG. 1.

FIG. 3 is a descriptive diagram diagrammatically showing the configurations of the polarization converter 4 and the light-incident-side polarizer 5 shown in FIG. 1. The polarization converter 4 includes a polarizing beam splitter array 41 and λ/2 retardation layers 46, as shown in FIG. 3. The polarizing beam splitter array 41 is so shaped that a plurality of columnar light transmissive plates 42 each having a parallelogram cross-section are bonded to each other. Polarization separation films 44 and reflection films 45 are alternately formed on the interfaces between the light transmissive plates 42. The thus configured polarizing beam splitter array 41 are formed by bonding a plurality of light transmissive substrates, on each of which the polarization separation film 44 and the reflection film 45 are formed, to each other in such a way that the polarization separation films 44 and the reflection films 45 are alternately disposed and obliquely cutting the resultant structure at a predetermined angle.

In the thus configured illuminator 120, the light having passed through the first optical integration lens 31 and the second optical integration lens 32 is separated by the polarization separation films 44 into the s-polarization component and the p-polarization component. The s-polarization component is reflected off the polarization separation films 44 at roughly right angles, further reflected off the reflection films 45 at roughly right angles, and exits out of the illuminator 120. On the other hand, the p-polarization component passes through the polarization separation films 44. The light exiting surface of the polarizing beam splitter array 41 is so configured that the λ/2 retardation layers 46 are formed on the surface portions through which the light passing through the polarization separation films 44 exits and no λ/2 retardation layers 46 is formed on the surface portions through which the light reflected off the reflection films 45 exits. The p-polarization component having passed through the polarization separation films 44 is therefore converted by the λ/2 retardation layers 46 into s-polarization component and exits out of the illuminator 120. As a result, the light flux having random polarization directions and having entered the polarization converter 4 exits roughly as a whole in the form of the s-polarization component.

The light having exited out of the polarization converter 4 also partially contains the p-polarization component. Therefore, in the present embodiment, the polarization converter 4 is provided with the light-incident-side polarizer 5 in the form of a wire-grid polarizer including a wire grid 50 integrally provided on the light exiting surface of the polarization converter 4. The wire grid 50 is formed of a plurality of metal thin wires 51 arranged in one direction. In a case where the metal thin wires 51 are arranged at intervals sufficiently smaller than the wavelength of the light incident thereon, the wire grid 50 transmits, out of the light incident thereon, a polarization component having an electric field vector perpendicular to the longitudinal direction of the metal thin wires 51 and reflects, out of the incident light, a polarization component having an electric field vector parallel to the longitudinal direction of the metal thin wires 51. Therefore, providing the wire grid 50 in correspondence with the polarized light that exits out of the polarization converter 4 allows the light that exits out of the light-incident-side polarizer 5 to be roughly entirely the s-polarization component.

In the present embodiment, to provide the wire grid 50 integrally on the light exiting surface of the polarization converter 4, a light transmissive undercoat film 55 is so formed as to cover the λ/2 retardation films 46, and the metal thin wires 51 are layered on a surface of the undercoat film 55 that is the surface opposite the λ/2 retardation films 46. The wire grid 50 (metal thin wires 51) is made of aluminum, silver, copper, platinum, gold, or an alloy primarily containing any of these materials. In the present embodiment, from the viewpoint of suppressing loss of the light absorbed by the wire grid 50 in the visible light wavelength region, the wire grid 50 is made of aluminum, an alloy primarily containing aluminum, silver, or an alloy primarily containing silver. Further, a light absorbing layer formed of a semiconductor film made, for example, of silicon or germanium, is provided on the light incident side of the metal thin wires 51, and the light absorbing layer also prevents the light incident on the wire grid 50 from the polarization converter 4 from being reflected off the metal thin wires 51.

A nano-imprint method is, for example, used to manufacture the thus configured wire grid 50. Although not shown, in the nano-imprint method, a metal film or any other film for forming the metal thin wires 51 is first deposited on the surface of the undercoat film 55, and a resist layer is then applied onto the metal film. A die for nano-imprinting is then pressed against the resist layer to transfer protrusions and recesses of the die to the resist layer to form a resist mask. Dry etching is then performed to pattern the metal film or any other film into the plurality of metal thin wires 51, and the resist mask is then removed.

To provide the wire grid 50 on the light exiting surface of the polarization converter 4 with the wire grid 50 integrated with the polarization converter 4, a light transmissive substrate on which the wire grid 50 has been formed may instead be so glued to the polarization converter 4 as to cover the λ/2 retardation films 46. In this case, either of the following aspects may be employed: The wire grid 50 is provided on a surface of the substrate that is the surface facing the polarization converter 4; and the wire grid 50 is provided on a surface of the substrate that is the surface opposite the polarization converter 4.

Figure 4:
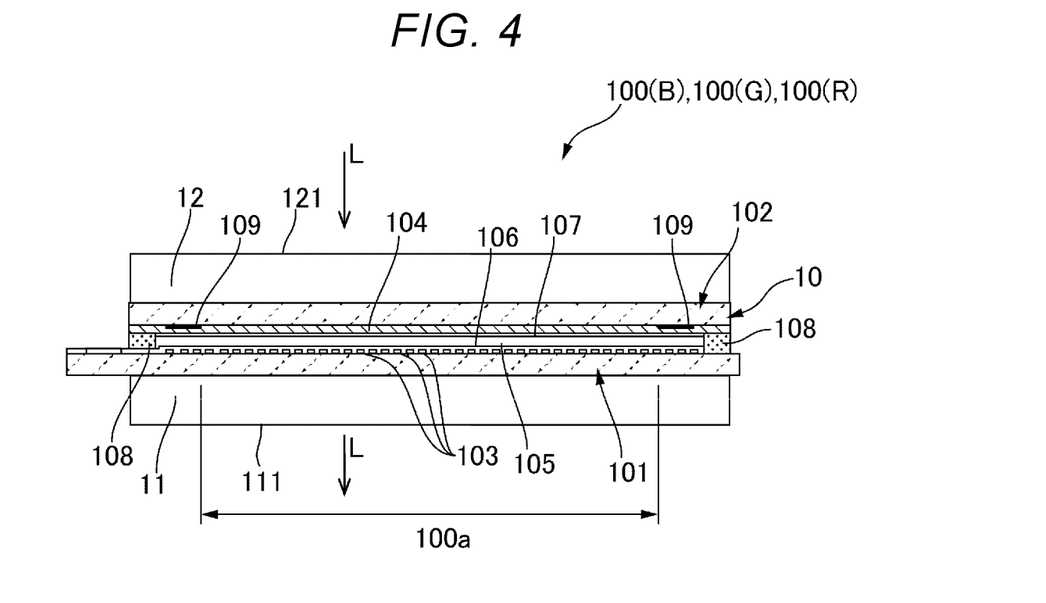
FIG. 4 is a cross-sectional view of each liquid crystal device shown in FIG. 1.

FIG. 4 is a cross-sectional view of each of the liquid crystal devices shown in FIG. 1. The first liquid crystal device 100(B) includes a liquid crystal panel 10, which a first substrate 101 (device substrate) and a second substrate 102 (counter substrate) are bonded to each other with a predetermined gap therebetween via a seal member 108, as shown in FIG. 4. The first substrate 101 and the second substrate 102 are each formed of a light transmissive substrate. In the liquid crystal panel 10, the seal member 108 is so provided as to form a frame-like shape extending along the outer edge of the second substrate 102, and a liquid crystal layer 105 is held in the area surrounded by the seal member 108 between the first substrate 101 and the second substrate 102. The seal member 108 is an adhesive made, for example, of a photosetting resin or a thermosetting resin, and a display area 100a is provided inside the seal member 108.

Pixel transistors (not shown) and light transmissive pixel electrodes 103 are formed in the form of a matrix on a surface of the first substrate 101 that is the surface facing the second substrate 102, and a first orientation film 106 is formed on the upper layers of the pixel electrodes 103. A light transmissive common electrode 104 is formed on a surface of the second substrate 102 that is the surface facing the first substrate 101, and a second orientation film 107 is formed on the upper layer of the common electrode 104. In the present embodiment, the common electrode 104 is formed across the entire second substrate 102. A light blocking layer 109 is formed on the lower layer of the common electrode 104 on one side of the second substrate 102 that is the side facing the first substrate 101. In the present embodiment, the light blocking layer 109 is so formed as to form a casing-like shape extending along the outer circumferential edge of the display area 100a and functions as a parting element. The light blocking layer 109 is formed as a black matrix in some cases in the portion that overlaps with the area sandwiched between adjacent pixel electrodes 103.

A first dustproof glass plate 11 is glued to a surface of the first substrate 101 that is the surface opposite the second substrate 102, and a second dustproof glass plate 12 is glued to a surface of the second substrate 102 that is the surface opposite the first substrate 101. Adhesion of foreign matter to a portion close to the liquid crystal layer 105 is therefore avoided, so that no foreign matter is likely to be displayed in an image.

In the thus configured first liquid crystal device 100(B), light incident from one of the first substrate 101 and the second substrate 102 is modulated before the light exits through the other substrate. In the present embodiment, light incident from the side facing the second substrate 102 is modulated before the light exits through the first substrate 101, as indicated by the arrow L. Therefore, the light incident surface of the first liquid crystal device 100(B) is a surface 121 of the second dustproof glass plate 12 that is the surface opposite the liquid crystal panel 10, and the light exiting surface of the first liquid crystal device 100(B) is a surface 111 of the first dustproof glass plate 11 that is the surface opposite the liquid crystal panel 10.

The configurations of the second liquid crystal device 100(G) and the third liquid crystal device 100(R) are each the same as that of the first liquid crystal device 100(B) and will therefore not be described.

Primary Effects Provided by Present Embodiment

As described above, in the projection-type display apparatus 1000 according to the present embodiment, the light-incident-side polarizer 5 is the wire-grid polarizer including the wire grid 50 integrally provided on the light exiting surface of the polarization converter 4. The polarization converter 4 and the light-incident-side polarizer 5 can therefore be handled as a single optical part. Therefore, even in the case where the polarization converter 4, the light-incident-side polarizer 5, the first liquid crystal device 100(B), and the first light-exiting-side polarizer 153 are arranged along the optical path from the light source section 2 to the projection system 1, the number of optical parts to be handled can be reliably reduced, whereby the projection-type display apparatus 1000 can be efficiently assembled.

Further, unlike in a case where the light-incident-side polarizer 5 is a discrete optical element, stress induced in the light-incident-side polarizer 5 is unlikely to result in breakage of the light-incident-side polarizer 5.

Moreover, unlike in a case where the light-incident-side polarizer 5 is so disposed as to face the first liquid crystal device 100(B), a smaller number of optical parts are disposed in the vicinity of the first liquid crystal device 100(B), whereby there is spatial room around the first liquid crystal device 100(B). The spatial room therefore readily achieves a configuration in which cooling air or any other fluid is caused to flow to a portion close to the first liquid crystal device 100(B), a configuration in which a holder that holds the first liquid crystal device 100(B) is provided with a channel through which cooling air or any other fluid is caused to flow, and other configurations. Accumulation of heat in the vicinity of the first liquid crystal device 100(B) can therefore be avoided. Further, in a case where no channel needs to be provided, the gap between the first liquid crystal device 100(B) and the relay lens 82 can, for example, be reduced, whereby the size of the projection-type display apparatus 1000 can be reduced.

Further, even in the case where a plurality of liquid crystal devices (first liquid crystal device 100(B), second liquid crystal device 100(G), and third liquid crystal device 100(R)) are provided, as in the projection-type display apparatus 1000 according to the present embodiment, the light-incident-side polarizer 5 functions as a polarizer common to the plurality of liquid crystal devices. Therefore, the number of parts and the number of steps of assembling the projection-type display apparatus 1000 can be reduced, as compared with a configuration in which the first liquid crystal device 100(B), the second liquid crystal device 100(G), and the third liquid crystal device 100(R) are each provided with a light-incident-side polarizer, whereby the cost of the projection-type display apparatus 1000 can be reduced. Moreover, the light having exited out of the light-incident-side polarizer 5 via the polarization converter 4 is a complete s-polarization component. Therefore, in the color separation system 7, the dichroic mirror 72 reflects the green light G formed of the complete s-polarization component, and the dichroic mirror 72 therefore has an excellent reflection characteristic as compared with a case where the dichroic mirror 72 reflects green light G containing the p-polarization component. Since the amount of green light G incident on the second liquid crystal device 100(G) can therefore be increased, whereby bright green light G is achieved in a projected image. The color balance of the projected image can therefore be improved.

Second Embodiment

Figure 5:
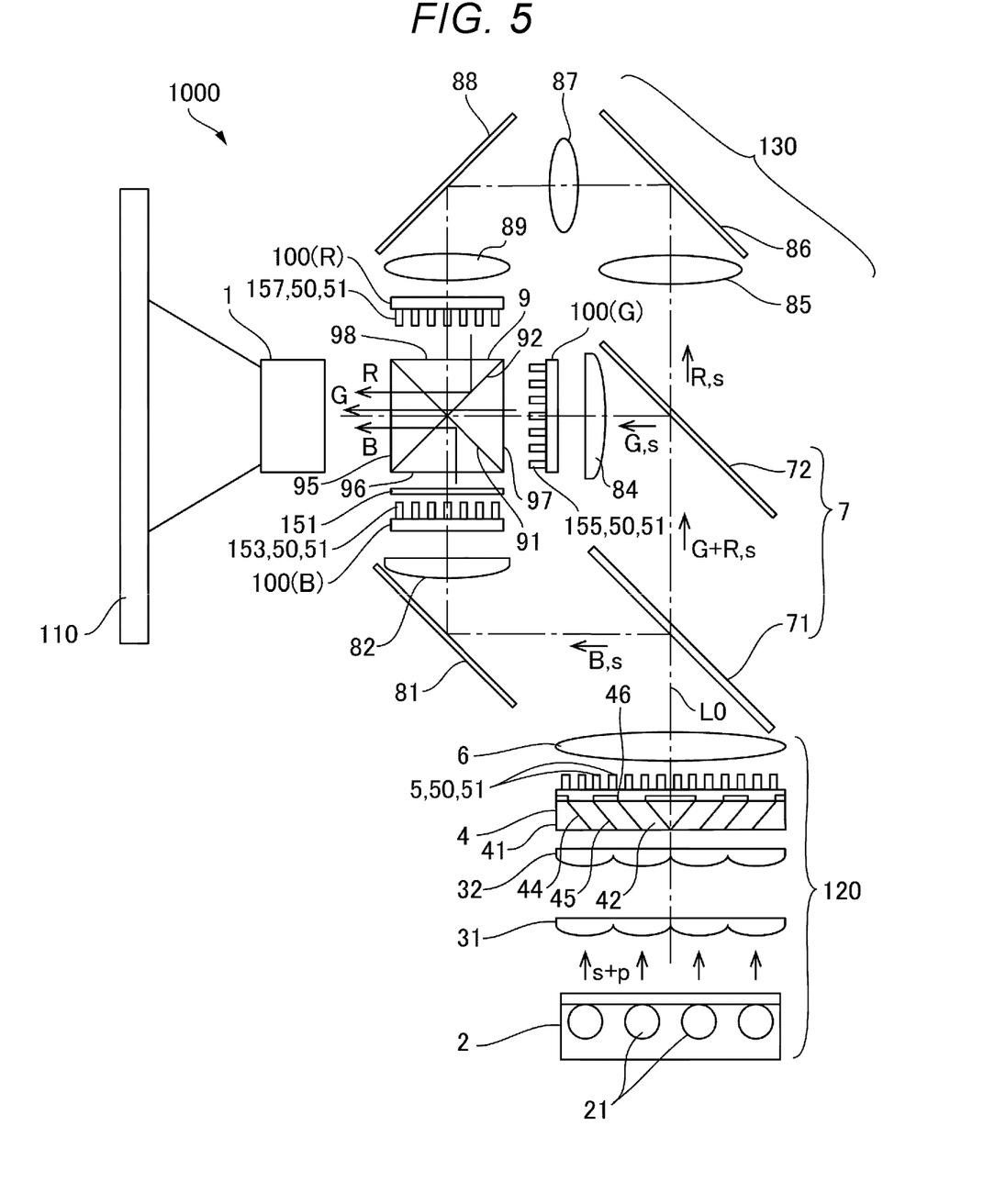
FIG. 5 is a descriptive diagram diagrammatically showing the configuration of a projection-type display apparatus according to a second embodiment of the present disclosure.

FIG. 5 is a descriptive diagram diagrammatically showing the configuration of the projection-type display apparatus 1000 according to a second embodiment of the present disclosure. The basic configuration of the projection-type display apparatuses 1000 according to the present embodiment and embodiments described later is the same as that in the first embodiment. Therefore, common portions have the same reference characters and will not be described.

In the projection-type display apparatus 1000 according to the present embodiment, the light-incident-side polarizer 5 is the wire-grid polarizer including the wire grid 50 integrally provided on the light exiting surface of the polarization converter 4, as shown in FIG. 5, as in the first embodiment. The polarization converter 4 and the light-incident-side polarizer 5 can therefore be handled as a single optical part, whereby the same effects as those provided by the first embodiment are provided, for example, the projection-type display apparatus 1000 can be efficiently assembled.

In the present embodiment, the first light-exiting-side polarizer 153 is a wire-grid polarizer including the wire grid 50 integrally provided on the light exiting surface (surface 111 shown in FIG. 4) of the first liquid crystal device 100(B). The second light-exiting-side polarizer 155 is a wire-grid polarizer including the wire grid 50 integrally provided on the light exiting surface (surface 111 shown in FIG. 4) of the second liquid crystal device 100(G). The third light-exiting-side polarizer 157 is a wire-grid polarizer including the wire grid 50 integrally provided on the light exiting surface (surface 111 shown in FIG. 4) of the third liquid crystal device 100(R).

The first light-exiting-side polarizer 153, the second light-exiting-side polarizer 155, and the third light-exiting-side polarizer 157 therefore do not need to be separately provided, whereby the projection-type display apparatus 1000 can be efficiently assembled. Further, stress induced in the first light-exiting-side polarizer 153, the second light-exiting-side polarizer 155, and the third light-exiting-side polarizer 157 is unlikely to result in breakage of the first light-exiting-side polarizer 153, the second light-exiting-side polarizer 155, and the third light-exiting-side polarizer 157, and other effects are provided.

The retardation film 151 may instead be provided on the side facing the light incident surface of the first liquid crystal device (B). In this case, the retardation film 151 may be so provided as to be integrated with the light incident surface (surface 121 shown in FIG. 4) of the first liquid crystal device (B).

Third Embodiment

Figure 6:
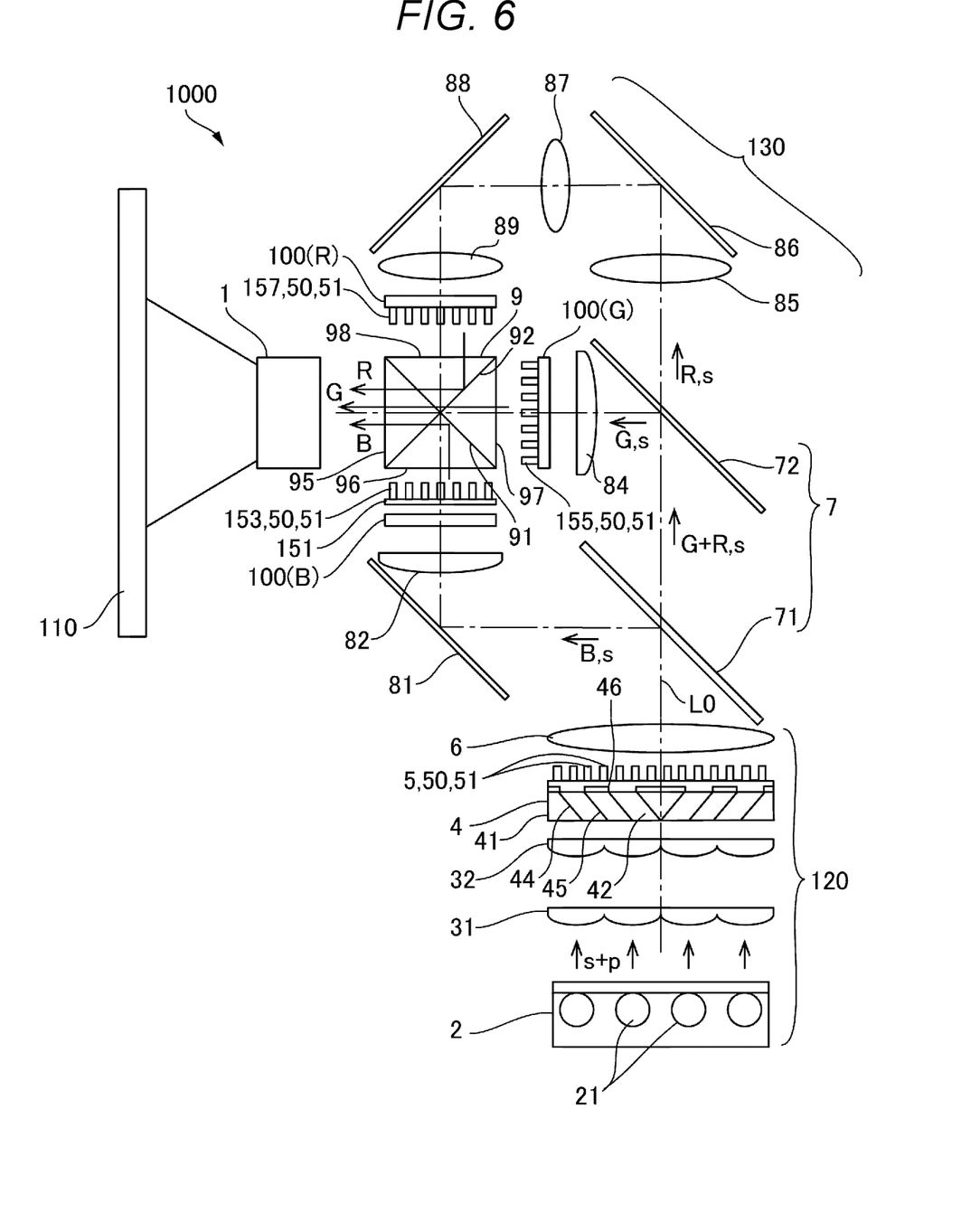
FIG. 6 is a descriptive diagram diagrammatically showing the configuration of a projection-type display apparatus according to a third embodiment of the present disclosure.

FIG. 6 is a descriptive diagram diagrammatically showing the configuration of the projection-type display apparatus 1000 according to a third embodiment of the present disclosure. In the projection-type display apparatus 1000 according to the present embodiment, the light-incident-side polarizer 5 is the wire-grid polarizer including the wire grid 50 integrally provided on the light exiting surface of the polarization converter 4, as shown in FIG. 6, as in the first embodiment. The polarization converter 4 and the light-incident-side polarizer 5 can therefore be handled as a single optical part, whereby the same effects as those provided by the first embodiment are provided, for example, the projection-type display apparatus 1000 can be efficiently assembled.

In present embodiment, the second light-exiting-side polarizer 155 is a wire-grid polarizer including the wire grid 50 integrally provided on the light exiting surface (surface 111 shown in FIG. 4) of the second liquid crystal device 100(G). The third light-exiting-side polarizer 157 is a wire-grid polarizer including the wire grid 50 integrally provided on the light exiting surface (surface 111 shown in FIG. 4) of the third liquid crystal device 100(R). The second light-exiting-side polarizer 155 and the third light-exiting-side polarizer 157 therefore do not need to be separately provided, whereby the projection-type display apparatus 1000 can be efficiently assembled. Further, stress induced in the second light-exiting-side polarizer 155 and the third light-exiting-side polarizer 157 is unlikely to result in breakage of the first light-exiting-side polarizer 153, the second light-exiting-side polarizer 155, and the third light-exiting-side polarizer 157, and other effects are provided.

In the present embodiment, the first light-exiting-side polarizer 153 is a wire-grid polarizer including the wire grid 50 integrally provided on one of the light incident surface and the light exiting surface of the retardation film 151. In the present embodiment, the first light-exiting-side polarizer 153 is a wire-grid polarizer including the wire grid 50 integrally provided on the light exiting surface of the retardation film 151. The first light-exiting-side polarizer 153 and the retardation film 151 therefore do not need to be separately provided, whereby the projection-type display apparatus 1000 can be efficiently assembled. Further, stress induced in the first light-exiting-side polarizer 153 is unlikely to result in breakage of the first light-exiting-side polarizer 153, and other effects are provided.

Fourth Embodiment

Figure 7:
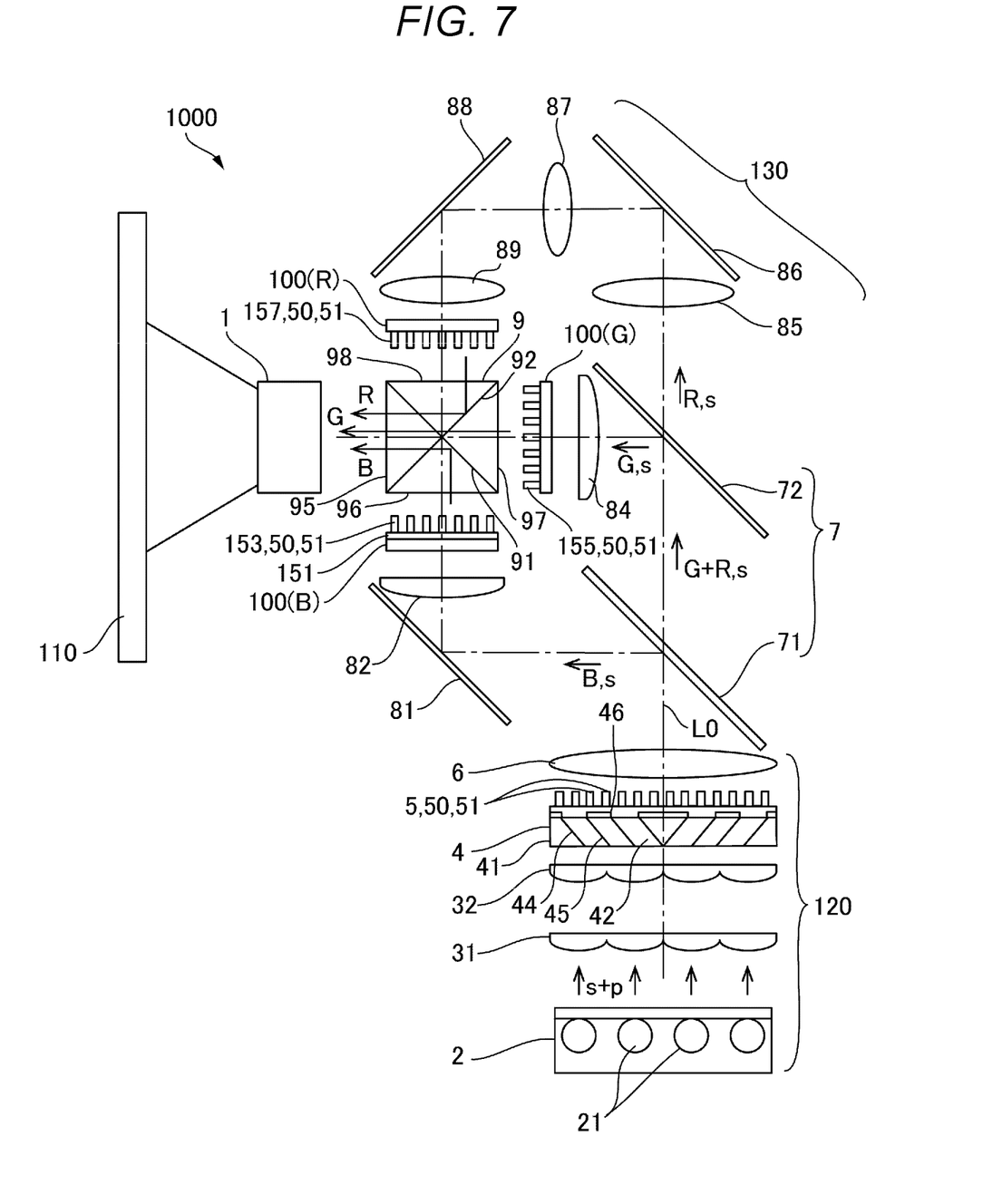
FIG. 7 is a descriptive diagram diagrammatically showing the configuration of a projection-type display apparatus according to a fourth embodiment of the present disclosure.

FIG. 7 is a descriptive diagram diagrammatically showing the configuration of the projection-type display apparatus 1000 according to a fourth embodiment of the present disclosure. In the projection-type display apparatus 1000 according to the present embodiment, the light-incident-side polarizer 5 is the wire-grid polarizer including the wire grid 50 integrally provided on the light exiting surface of the polarization converter 4, as shown in FIG. 7, as in the first embodiment. The polarization converter 4 and the light-incident-side polarizer 5 can therefore be handled as a single optical part, whereby the same effects as those provided by the first embodiment are provided, for example, the projection-type display apparatus 1000 can be efficiently assembled.

In present embodiment, the second light-exiting-side polarizer 155 is the wire-grid polarizer including the wire grid 50 integrally provided on the light exiting surface (surface 111 shown in FIG. 4) of the second liquid crystal device 100(G). The third light-exiting-side polarizer 157 is the wire-grid polarizer including the wire grid 50 integrally provided on the light exiting surface (surface 111 shown in FIG. 4) of the third liquid crystal device 100(R). The second light-exiting-side polarizer 155 and the third light-exiting-side polarizer 157 therefore do not need to be separately provided, whereby the projection-type display apparatus 1000 can be efficiently assembled. Further, stress induced in the second light-exiting-side polarizer 155 and the third light-exiting-side polarizer 157 is unlikely to result in breakage of the second light-exiting-side polarizer 155 and the third light-exiting-side polarizer 157, and other effects are provided.

In the present embodiment, the retardation film 151 is so provided as to be integrated with the light exiting surface (surface 111 shown in FIG. 4) of the first liquid crystal device (B). The first light-exiting-side polarizer 153 is the wire-grid polarizer including the wire grid 50 integrally provided on one of the light incident surface and the light exiting surface of the retardation film 151. In the present embodiment, the first light-exiting-side polarizer 153 is the wire-grid polarizer including the wire grid 50 integrally provided on the light exiting surface of the retardation film 151. The retardation film 151 and the first light-exiting-side polarizer 153 are therefore so provided as to be integrated with the light exiting surface (surface 111 shown in FIG. 4) of the first liquid crystal device (B). The retardation film 151 and the first light-exiting-side polarizer 153 therefore do not need to be separately provided, whereby the projection-type display apparatus 1000 can be efficiently assembled. Further, stress induced in the first light-exiting-side polarizer 153 is unlikely to result in breakage of the first light-exiting-side polarizer 153, and other effects are provided.

Fifth Embodiment

Figure 8:
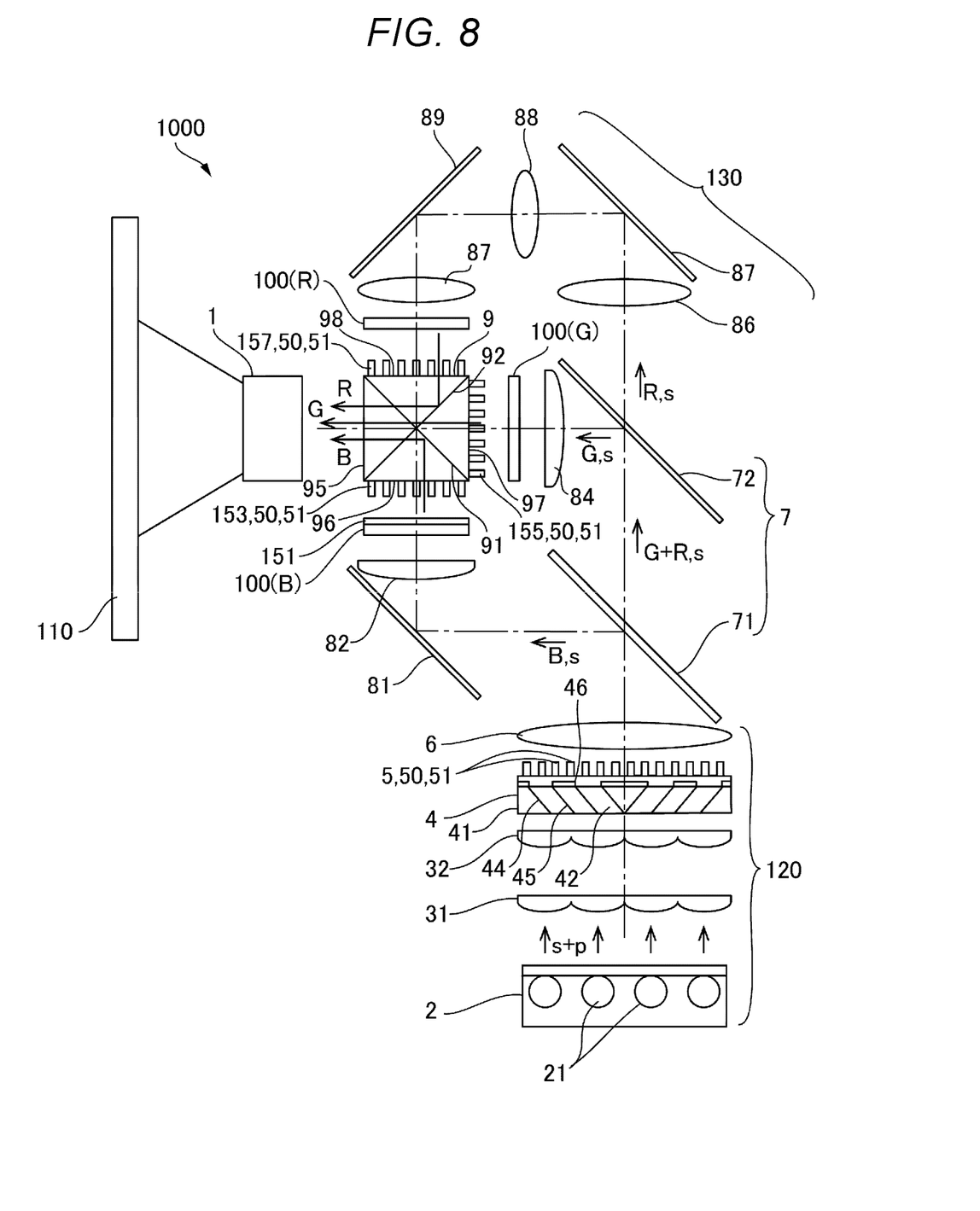
FIG. 8 is a descriptive diagram diagrammatically showing the configuration of a projection-type display apparatus according to a fifth embodiment of the present disclosure.

FIG. 8 is a descriptive diagram diagrammatically showing the configuration of the projection-type display apparatus 1000 according to a fifth embodiment of the present disclosure. In the projection-type display apparatus 1000 according to the present embodiment, the light-incident-side polarizer 5 is the wire-grid polarizer including the wire grid 50 integrally provided on the light exiting surface of the polarization converter 4, as shown in FIG. 8, as in the first embodiment. The polarization converter 4 and the light-incident-side polarizer 5 can therefore be handled as a single optical part, whereby the same effects as those provided by the first embodiment are provided, for example, the projection-type display apparatus 1000 can be efficiently assembled.

In the present embodiment, the retardation film 151 is so provided as to be integrated with the light exiting surface (surface 111 shown in FIG. 4) of the first liquid crystal device (B). The first light-exiting-side polarizer 153 is a wire-grid polarizer including the wire grid 50 integrally provided on the first light incident surface 96 of the cross dichroic prism 9. The second light-exiting-side polarizer 155 is a wire-grid polarizer including the wire grid 50 integrally provided on the second light incident surface 97 of the cross dichroic prism 9. The third light-exiting-side polarizer 157 is a wire-grid polarizer including the wire grid 50 integrally provided on the third light incident surface 98 of the cross dichroic prism 9.

The first light-exiting-side polarizer 153, the second light-exiting-side polarizer 155, and the third light-exiting-side polarizer 157 therefore do not need to be separately provided, whereby the projection-type display apparatus 1000 can be efficiently assembled. Further, stress induced in the first light-exiting-side polarizer 153, the second light-exiting-side polarizer 155, and the third light-exiting-side polarizer 157 is unlikely to result in breakage of the first light-exiting-side polarizer 153, the second light-exiting-side polarizer 155, and the third light-exiting-side polarizer 157, and other effects are provided.

The retardation film 151 is so provided as to be integrated with the light exiting surface (surface 111 shown in FIG. 4) of the first liquid crystal device (B). The retardation film 151 therefore does not need to be separately provided, whereby the projection-type display apparatus 1000 can be efficiently assembled.

Sixth Embodiment

Figure 9:
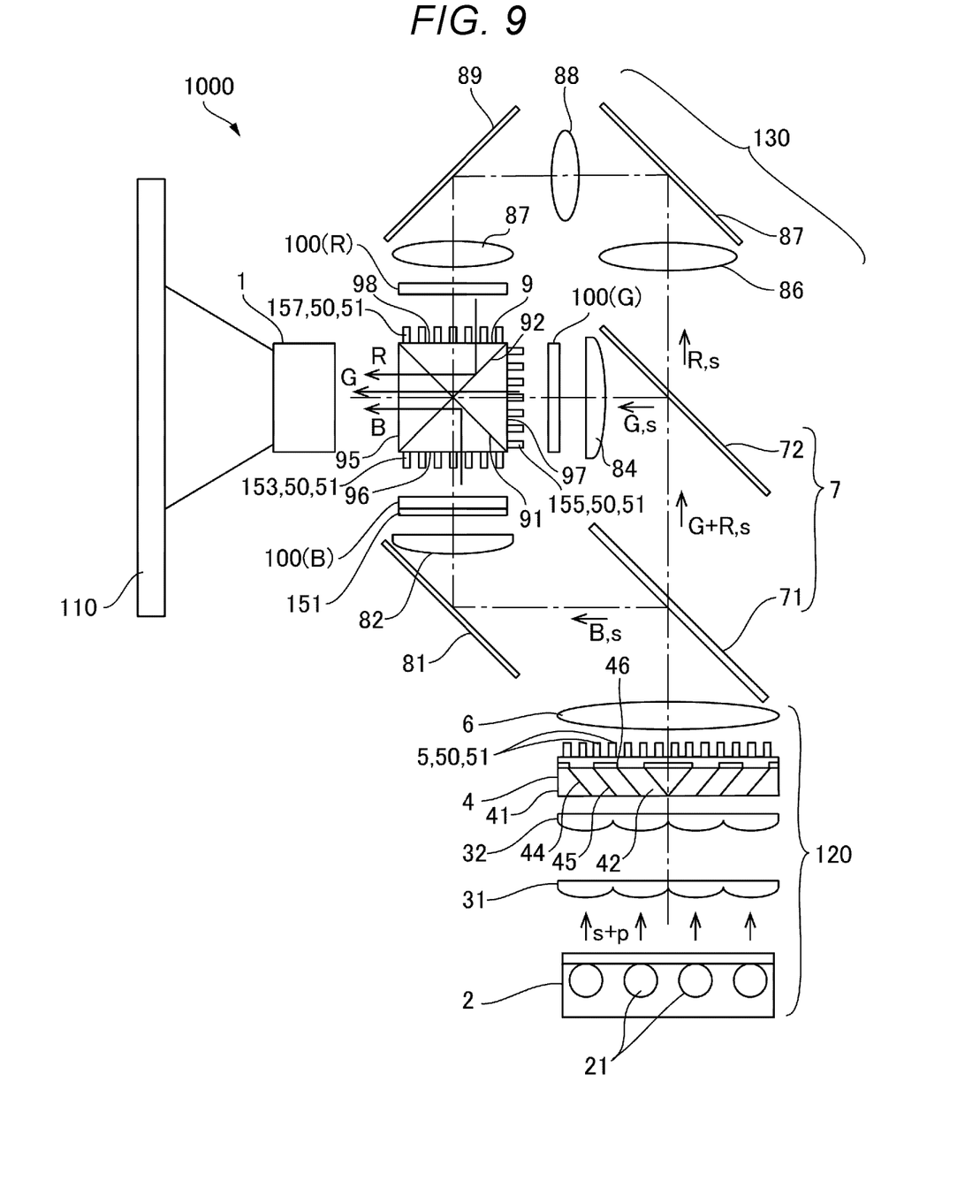
FIG. 9 is a descriptive diagram diagrammatically showing the configuration of a projection-type display apparatus according to a sixth embodiment of the present disclosure.

FIG. 9 is a descriptive diagram diagrammatically showing the configuration of the projection-type display apparatus 1000 according to a sixth embodiment of the present disclosure. In the fifth embodiment, the retardation film 151 is so provided as to be integrated with the light exiting surface (surface 111 shown in FIG. 4) of the first liquid crystal device (B). The retardation film 151 may instead so provided as to be integrated with the light incident surface (surface 121 shown in FIG. 4) of the first liquid crystal device (B), as shown in FIG. 9.

Seventh Embodiment

Figure 10:
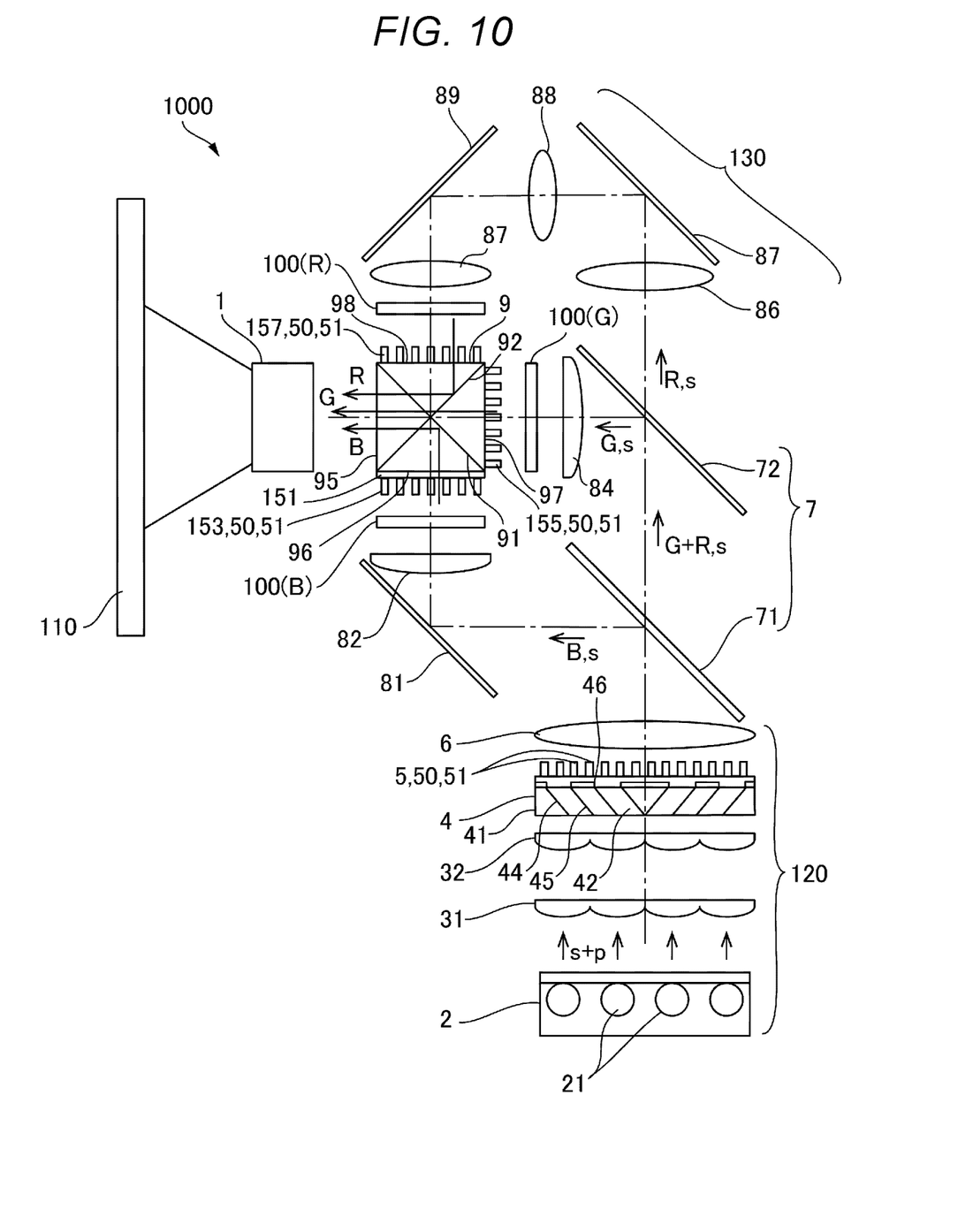
FIG. 10 is a descriptive diagram diagrammatically showing the configuration of a projection-type display apparatus according to a seventh embodiment of the present disclosure.

FIG. 10 is a descriptive diagram diagrammatically showing the configuration of the projection-type display apparatus 1000 according to a seventh embodiment of the present disclosure. In the projection-type display apparatus 1000 according to the present embodiment, the light-incident-side polarizer 5 is the wire-grid polarizer including the wire grid 50 integrally provided on the light exiting surface of the polarization converter 4, as shown in FIG. 10, as in the first embodiment. The polarization converter 4 and the light-incident-side polarizer 5 can therefore be handled as a single optical part, whereby the same effects as those provided by the first embodiment are provided, for example, the projection-type display apparatus 1000 can be efficiently assembled.

In the present embodiment, the second light-exiting-side polarizer 155 is the wire-grid polarizer including the wire grid 50 integrally provided on the second light incident surface 97 of the cross dichroic prism 9. More specifically, the second light-exiting-side polarizer 155 is a wire-grid polarizer including the wire grid 50 layered on the second light incident surface 97 of the cross dichroic prism 9. The third light-exiting-side polarizer 157 is the wire-grid polarizer including the wire grid 50 integrally provided on the third light incident surface 98 of the cross dichroic prism 9. More specifically, the third light-exiting-side polarizer 157 is a wire-grid polarizer including the wire grid 50 layered on the third light incident surface 98 of the cross dichroic prism 9. The second light-exiting-side polarizer 155 and the third light-exiting-side polarizer 157 therefore do not need to be separately provided, whereby the projection-type display apparatus 1000 can be efficiently assembled. Further, stress induced in the second light-exiting-side polarizer 155 and the third light-exiting-side polarizer 157 is unlikely to result in breakage of the second light-exiting-side polarizer 155, and the third light-exiting-side polarizer 157, and other effects are provided.

In the present embodiment, the retardation film 151 is so provided as to be integrated with the first light incident surface 96 of the cross dichroic prism 9. The first light-exiting-side polarizer 153 is the wire-grid polarizer including the wire grid 50 integrally provided on one of the light incident surface and the light exiting surface of the retardation film 151. In the present embodiment, the first light-exiting-side polarizer 153 is the wire-grid polarizer including the wire grid 50 integrally provided on the light incident surface of the retardation film 151. The retardation film 151 and the first light-exiting-side polarizer 153 are therefore so provided as to be integrated with the first light incident surface 96 of the cross dichroic prism 9. The retardation film 151 and the first light-exiting-side polarizer 153 therefore do not need to be separately provided, whereby the projection-type display apparatus 1000 can be efficiently assembled. Further, stress induced in the first light-exiting-side polarizer 153 is unlikely to result in breakage of the first light-exiting-side polarizer 153, and other effects are provided. The first light-exiting-side polarizer 153 may instead be the wire-grid polarizer including the wire grid 50 layered on the first light incident surface 96 of the cross dichroic prism 9. In this case, the first light-exiting-side polarizer 153 is so provided as to be integrated with the light exiting surface of the retardation film 151.

Other Projection-Type Display Apparatuses

In the projection-type display apparatus 1000 according to any of the embodiments described above, the first liquid crystal device (B), the second liquid crystal device (G), and the third liquid crystal device (R) are each a transmissive liquid crystal device. A projection-type display apparatus in which the first liquid crystal device (B), the second liquid crystal device (G), and the third liquid crystal device (R) are each a reflective liquid crystal device may also employ the configuration in which the light-incident-side polarizer 5 is the wire-grid polarizer including the wire grid 50 integrally provided on the light exiting surface of the polarization converter 4 and other configurations.

The projection-type display apparatus 1000 according to any of the embodiments described above includes the three liquid crystal devices by way of example. A projection-type display apparatus including one liquid crystal device or two liquid crystal devices may also employ the configuration in which the light-incident-side polarizer is the wire-grid polarizer including the wire grid 50 integrally provided on the light exiting surface of the polarization converter 4 and other configurations and the like.

What is claimed is:

1. A projection-type display apparatus comprising:
a light source that outputs light having a first polarization component and a second polarization component having a polarization direction different from a polarization direction of the first polarization component;
a polarization converter on which the light is incident, which includes
a polarizing beam splitter array which separates the light into the first polarization component and the second polarization component,
a light exiting surface via which the light that is incident on the polarization converter exits,
a retardation layer located between the polarizing beam splitter array and the light exiting surface, which converts the second polarization component into the first polarization component, and
a wire grid laminated on the light exiting surface, that transmits the first polarization component out of the light;
a first liquid crystal device that modulates light having exited out of the polarization converter;
a first light-exiting-side polarizer provided in an optical path of light having exited out of the first liquid crystal device; and
a projection system that projects light having exited out of the first light-exiting-side polarizer.

2. The projection-type display apparatus according to claim 1, further comprising:
a color separation system that separates from the light having exited out of the polarization converter into first color light to be incident on the first liquid crystal device and second color light that belongs to a wavelength region different from a wavelength region to which the first color light belongs;
a second liquid crystal device on which the second color light is incident and which modulates the second color light;
a second light-exiting-side polarizer provided in an optical path of light having exited out of the second liquid crystal device; and
a first dichroic mirror that combines the light having exited out of the first light-exiting-side polarizer and light having exited out of the second light-exiting-side polarizer with each other and causes the combined light to exit toward the projection system.

3. The projection-type display apparatus according to claim 2, further comprising:
a third liquid crystal device that modulates third color light that belongs to a wavelength region different from the wavelength regions to which the first color light and the second color light belong;
a third light-exiting-side polarizer provided in a light exiting optical path from the third liquid crystal device; and
a cross dichroic prism that includes a first dichroic mirror and a second dichroic mirror and combines an optical path from the first light-exiting-side polarizer to the projection system, an optical path from the second light-exiting-side polarizer to the projection system, and an optical path from the third light-exiting-side polarizer to the projection system with one another,
wherein the color separation system separates the first color light and the second color light and further the third color light from the light having exited out of the polarization converter.

4. The projection-type display apparatus according to claim 1,
wherein the first light-exiting-side polarizer is a wire-grid polarizer including a wire grid integrally provided on a light exiting surface of the first liquid crystal device.

5. The projection-type display apparatus according to claim 2,
wherein the first light-exiting-side polarizer is a wire-grid polarizer including a wire grid layered on a light exiting surface of the first liquid crystal device.

6. The projection-type display apparatus according to claim 2, further comprising
a retardation film provided in an optical path from the first liquid crystal device to the first dichroic mirror.

7. The projection-type display apparatus according to claim 6,
wherein the retardation film is integrally provided on a light exiting surface of the first liquid crystal device.

8. The projection-type display apparatus according to claim 6,
wherein the first light-exiting-side polarizer is a wire-grid polarizer including a wire grid integrally provided on one of a light incident surface and a light exiting surface of the retardation film.

9. The projection-type display apparatus according to claim 2,
wherein a retardation film is integrally provided on a light incident surface of the first liquid crystal device.

10. The projection-type display apparatus according to claim 3, further comprising
a retardation film provided in an optical path from the first liquid crystal device to the cross dichroic prism,
wherein the retardation film is so provided as to be integrated with the cross dichroic prism.

11. The projection-type display apparatus according to claim 10,
wherein the first light-exiting-side polarizer is a wire-grid polarizer including a wire grid integrally provided on one of a light incident surface and a light exiting surface of the retardation film.

12. The projection-type display apparatus according to claim 2,
wherein the second light-exiting-side polarizer is a wire-grid polarizer including a wire grid integrally provided on a light exiting surface of the second liquid crystal device.

13. The projection-type display apparatus according to claim 3,
wherein the third light-exiting-side polarizer is a wire-grid polarizer including a wire grid integrally provided on a light exiting surface of the third liquid crystal device.

14. The projection-type display apparatus according to claim 3, wherein at least one of the first light-exiting-side polarizer, the second light-exiting-side polarizer, and the third light-exiting-side polarizer is a wire-grid polarizer including a wire grid layered on the cross dichroic prism.

15. The projection-type display apparatus according to claim 3,
wherein the first light-exiting-side polarizer, the second light-exiting-side polarizer, and the third light-exiting-side polarizer are each a wire-grid polarizer including a wire grid layered on the cross dichroic prism.

16. A projection-type display apparatus comprising:
a light source that outputs light having a first polarization component and a second polarization component having a polarization direction different from a polarization direction of the first polarization component;
a polarization converter on which the light is incident, which transmits the first polarization component, and converts the second polarization component into the first polarization component and causes the converted first polarization component to exit;
a light-incident-side polarizer that transmits the first polarization component out of light having exited out of the polarization converter;
a first liquid crystal device that modulates light having exited out of the light-incident-side polarizer;
a first light-exiting-side polarizer provided in an optical path of light having exited out of the first liquid crystal device;
a projection system that projects light having exited out of the first light-exiting-side polarizer,
a color separation system that separates from the light having exited out of the light-incident-side polarizer into first color light to be incident on the first liquid crystal device and second color light that belongs to a wavelength region different from a wavelength region to which the first color light belongs;
a second liquid crystal device on which the second color light is incident and which modulates the second color light;
a second light-exiting-side polarizer provided in an optical path of light having exited out of the second liquid crystal device; and
a first dichroic mirror that combines the light having exited out of the first light-exiting-side polarizer and light having exited out of the second light-exiting-side polarizer with each other and causes the combined light to exit toward the projection system,
wherein the light-incident-side polarizer includes a wire grid layered on a light exiting surface of the polarization converter.

17. A projection-type display apparatus comprising:
a light source that outputs light having a first polarization component and a second polarization component having a polarization direction different from a polarization direction of the first polarization component;
a polarization converter on which the light is incident, which transmits the first polarization component, and converts the second polarization component into the first polarization component and causes the converted first polarization component to exit;
a light-incident-side polarizer that transmits the first polarization component out of light having exited out of the polarization converter;
a first liquid crystal device that modulates light having exited out of the light-incident-side polarizer;
a first light-exiting-side polarizer provided in an optical path of light having exited out of the first liquid crystal device; and
a projection system that projects light having exited out of the first light-exiting-side polarizer,
wherein the light-incident-side polarizer includes a wire grid layered on a light exiting surface of the polarization converter, and
wherein the first light-exiting-side polarizer is a wire-grid polarizer including a wire grid integrally provided on a light exiting surface of the first liquid crystal device.

* * * * *